115 SHIPS.
PROPULSION.
1891 Crank Paddles.

Pat. Apr. 28 1836

4-28-1836

CLASSIFICATION
9615-X
DIVISION.

9615X

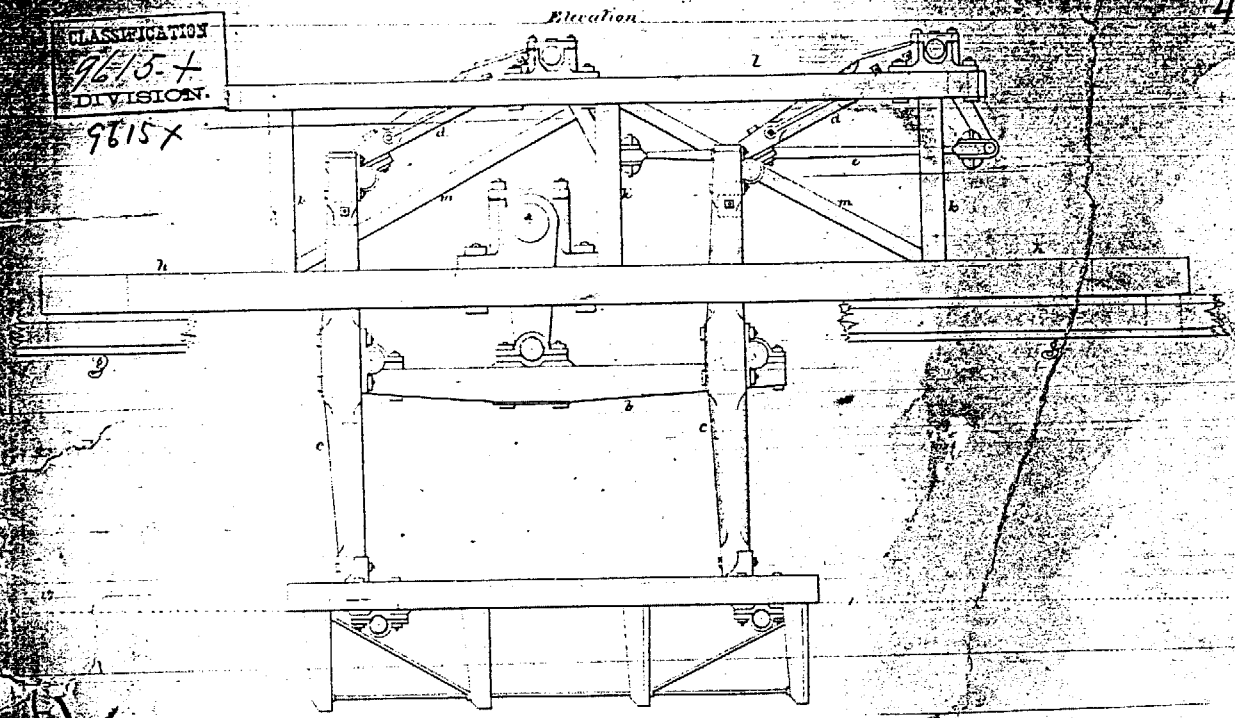

O/P

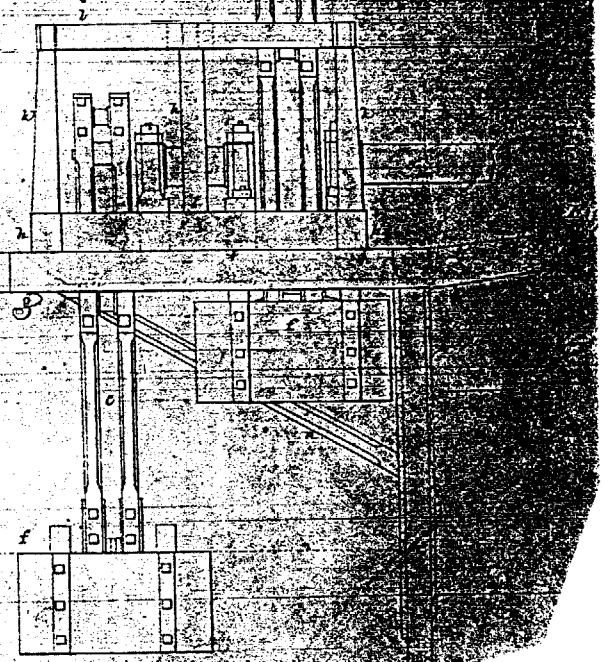

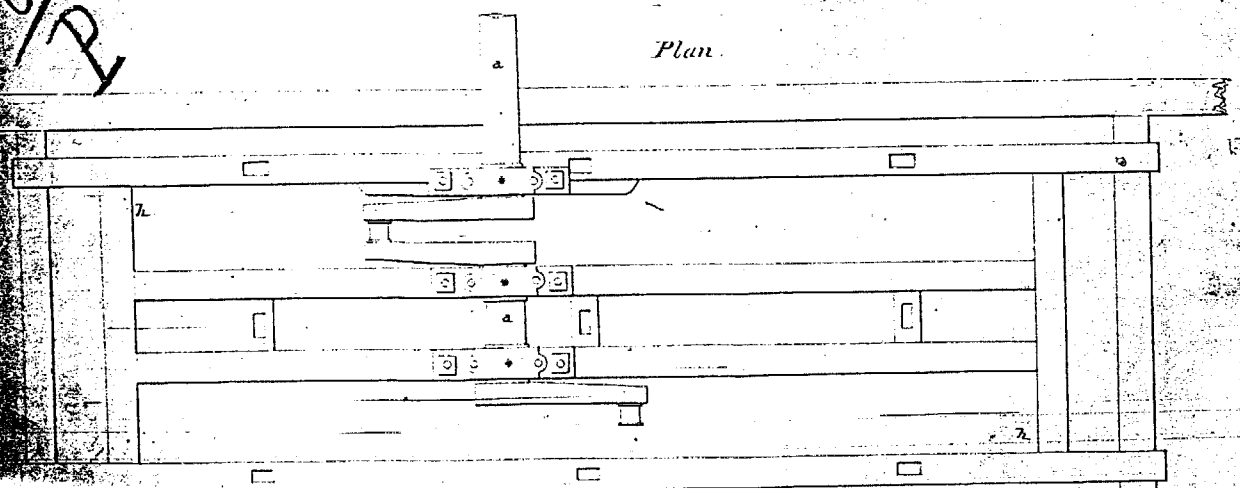

References.

a. The main Shaft. b. Connecting rod between
c. The radius bars. d. The arms on the rocking shaf
for the rocking Shafts. f. the paddle frame with the
g. The guards. h. the main framing. k. The upright
m. Braces to strengthen the frame work. n. Brac Fig. 1. Rocking Shaft, arm and Braces.
Fig. 2. Cast Iron wrists for the Radius Bars.
Fig. 3 and Fig. 4. two views of the cast iron piece [illegible]
the paddle frame.

N. B. The same letters refer to the same parts in each of [illegible]

Apl. 28. 1836 9615X

John Cochrane, of Baltimore. Md.
Letters Patent.

The Schedule referred to in these Letters patent and making part of the same, containing a description in the words of the said John Cochrane himself, of his improvement in Steam boat paddles.

---

To all to whom these presents shall come. Be it known that I. John Coch-rane of Baltimore in the County of Baltimore, and State of Maryland; have invented a new and useful improvement in Steam boat paddles, and that the following is a full and exact description thereof.

Specification 1st. the paddle boards are attached by arms to strong frames (the arms having a slot or notch to admit the boards) the frames may contain any convenient number of paddles, say five or six which are to be of the usual dimensions in proportion to the size of the boat. 2nd. two of these frames are on each side of the vessel and act alternately in the water; for inside navigation one paddle frame might be outside of the other but for outside or ocean navigation or twin boats it might be better for one to follow the other. 3rd. the paddle frames are hung by two radius bars at each end (framed together and strengthened by diagonal rods of iron to prevent lateral oscillation) from levers above on rocking shafts to strong iron pins bolted to the paddle frames. 4th these levers lower the paddles into the water while they are acting and raise them, when they are going to fetch a stroke 5th The alternate motions of the paddles and levers are effected by cranks. I claim the invention of the whole arrangement of the above described horizontal paddles and the model and drawings herewith deposited and referred to for further particulars, and are considered sufficient to enable any competent mechanic to construct them. This invention is the result of a thorough investigation of the principle upon which paddles act in propelling Steam boats. it is clear of all the acknowledged defects of the wheels and combines all the desideratum in paddles. In comparing the horizontal paddles with the wheels now in use, the following advantages are manifest. 1st The Horizontal paddles act vertically in the water entering and withdrawing, but the wheels enter and withdraw obliquely, thereby break-
-ing and lifting the water and causing a useless expenditure of about one
third of the whole power. 2nd Owing to the number of paddles that are brought
to act at once and their vertical position they take such a firm hold in
the water that the engine is enabled to impart nearly the whole of its
power to the speed of the boat - whereas with the wheels about two thirds of the
power is only applied to advantage - 3d the application of power and ex-
-penditure of steam are regulated by the resistance with which the paddles
meet - to the greatest resistance - the greatest power - and when the engine is
passing its centres, all the paddles are out of the water and consequently at
that time, there is no resistance - But in the wheels the resistance is con-
-stantly the same, which reduces the power to about three fourths of what the
engine is capable of exerting at the quadrature - 4th The motion can be
reversed with greater facility and when necessary all the paddles can be
retained out of the water which would prevent many serious accidents
to which the wheels are subject, such as running down boats, damaging
the paddles or floating logs &c. 5th in outside or ocean navigation they
are vastly superior to the wheels for they will work with nearly the same
ease to the engine in rough as in smooth water, whereas in rough seas
the wheels become swamped, which not only endangers the shafts but is
very injurious to the machinery; and as they do not require the paddle boxes
to rise higher than the bulwark, they would not present any extra sur-
-face to the wind, which is a most desirable property and are never to
be attained by the wheels - 6th they are well calculated for canal track-
-ing, for owing to the manner in which they act they make no surge
in the water, consequently would not injure the banks. :
7th they would act as most powerful ice-breakers and be completely
free from the inconvenience to which the wheels are subject such as
carrying pieces of ice up into the paddle boxes which frequently choke
them up and stop them. In short they are superior to the wheels
in every respect, and will ultimately bring steam navigation to perfection.

Witnesses,
R. Mayo, Robt. Mills

John Cochrane.

Ex. [illegible]

[illegible] 30 [illegible]

Drawings